US008960513B2

(12) United States Patent
    Crandall

(10) Patent No.: US 8,960,513 B2
(45) Date of Patent: Feb. 24, 2015

(54) INFIELD BACKPACK FOR CARRYING A SPOTTING SCOPE ATTACHED TO A TRIPOD

(75) Inventor: Kevin Crandall, Santa Rosa, CA (US)

(73) Assignee: DayMen Canada Acquisition ULC, Vancouver (CA)

( * ) Notice: Subject to any disclaimer, the term of this patent is extended or adjusted under 35 U.S.C. 154(b) by 72 days.

(21) Appl. No.: 13/824,914

(22) PCT Filed: Sep. 20, 2011

(86) PCT No.: PCT/US2011/052388
    § 371 (c)(1),
    (2), (4) Date: Apr. 29, 2013

(87) PCT Pub. No.: WO2012/040222
    PCT Pub. Date: Mar. 29, 2012

(65) Prior Publication Data
    US 2014/0151423 A1    Jun. 5, 2014

Related U.S. Application Data

(60) Provisional application No. 61/384,597, filed on Sep. 20, 2010.

(51) Int. Cl.
    *A45F 5/00*    (2006.01)
(52) U.S. Cl.
    USPC ............ 224/576; 224/578; 224/579; 224/580
(58) Field of Classification Search
    CPC ................ A45F 5/00; A45F 2003/003; A45F 2005/002; A45F 2004/023; A45C 5/14; A45C 5/141; A45C 5/143; A45C 5/145

USPC .......................................... 224/576, 578–584
See application file for complete search history.

(56) References Cited

U.S. PATENT DOCUMENTS

| 4,114,667 | A |   | 9/1978  | Belson |         |
|-----------|---|---|---------|--------|---------|
| 4,359,383 | A |   | 11/1982 | Sweet  |         |
| 4,561,576 | A | * | 12/1985 | Lowe et al. | 224/580 |
| 5,012,964 | A | * | 5/1991  | Falletta et al. | 224/153 |

(Continued)

FOREIGN PATENT DOCUMENTS

| CA | 2083894 A1 | 5/1994 |
|----|------------|--------|
| CN | 201337062  | 11/2009 |

(Continued)

OTHER PUBLICATIONS

"International Search Report", PCT/US2011/052388, (Feb. 8, 2012).

(Continued)

*Primary Examiner* — Brian D Nash
(74) *Attorney, Agent, or Firm* — Medler Ferro PLLC (57) ABSTRACT

A backpack is disclosed for carrying a spotting scope or other optic device attached to a tripod. The backpack includes an optics storage compartment having an interior that is accessible from a front of the backpack and first and second tripod leg attachment structures positioned below the optics storage compartment for securing first and second legs of the tripod against a corresponding first and second side of the backpack. When the tripod is attached to the backpack by the first and second tripod leg attachment structures, the spotting scope is positioned to be rotatable into and out of the interior of the optics storage compartment by a user.

16 Claims, 7 Drawing Sheets

(56) References Cited

U.S. PATENT DOCUMENTS

| | | | |
|---|---|---|---|
| 5,540,364 A * | 7/1996 | Krieger et al. | 224/153 |
| 5,628,443 A * | 5/1997 | Deutsch | 224/583 |
| 5,642,846 A | 7/1997 | Morrow | |
| 5,676,293 A * | 10/1997 | Farris | 224/576 |
| 5,743,447 A * | 4/1998 | McDermott | 224/153 |
| 5,779,036 A * | 7/1998 | Westbrook et al. | 206/292 |
| 5,826,771 A * | 10/1998 | Peng | 224/651 |
| 5,862,967 A | 1/1999 | Johnson | |
| 6,550,651 B1 | 4/2003 | Murdoch et al. | |
| 6,712,250 B2 * | 3/2004 | Vigny | 224/640 |
| 7,717,263 B2 | 5/2010 | Evans et al. | |
| 7,959,048 B1 | 6/2011 | Cyr | |
| 2005/0230445 A1 * | 10/2005 | Woo | 224/576 |
| 2006/0240960 A1 * | 10/2006 | Shahinpoor | 482/121 |
| 2007/0062996 A1 | 3/2007 | Miles et al. | |
| 2007/0145089 A1 * | 6/2007 | Robert | 224/637 |
| 2009/0206118 A1 * | 8/2009 | Sabbah | 224/652 |
| 2011/0186611 A1 * | 8/2011 | Eberle | 224/583 |
| 2011/0204114 A1 * | 8/2011 | Miller | 224/582 |

FOREIGN PATENT DOCUMENTS

| | | |
|---|---|---|
| JP | 2004213010 | 7/2004 |
| KP | 2009-0028071 | 3/2009 |
| WO | 2008013503 | 1/2008 |

OTHER PUBLICATIONS

SIPO Search Report; Chinese Appl. No. 2011800451320; Jul. 2, 2014.

* cited by examiner

INFIELD BACKPACK FOR CARRYING A SPOTTING SCOPE ATTACHED TO A TRIPOD

FIELD OF THE INVENTION

The present invention relates to a backpack for carrying an optic device, such as a spotting scope, having a tripod. More particularly, the backpack secures the tripod to a front thereof and includes a compartment that houses and protects the optic device while attached to the tripod.

BACKGROUND OF THE INVENTION

Birdwatching or birding is a vastly popular past time. Often birding enthusiasts or "birders" will carry a spotting or birding scope that includes an optics component to enable higher magnification of birds being viewed from a distance than may be obtained with binoculars. Due to the size, weight and need for stability when viewing through the spotting scope, the spotting scope is generally used with a tripod or other support device. However, birders often also carry other paraphernalia of birdwatching, such as binoculars, cameras, notebooks, birdwatching reference books, and/or various electronic devices, for e.g., computers, recording devices, cell phones, etc. as well as personal items, such as food, water and/or clothing for inclement weather. With so many items being useful and desired while out in the field birding, the reality is that often choices have to be made as to what equipment and supplies will be carried along on any particular outing based on the birder's ability to carry and readily use/access the equipment he or she carries. Although the spotting scope and tripod are valued pieces of equipment in the field, they may be left behind in favor of one or more pieces of more easily carried and accessed equipment because the conventional manner of carrying the spotting scope-tripod combination is leaning it over or against a shoulder of the birder, which is often burdensome and unsatisfactory. As such, a need exist in the art for an improved manner of transporting and using a spotting scope attached to a tripod in the field that does not interfere with but rather aids in the use of other equipment and supplies that might be carried by a birder.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements. The terms "rear," "rearward," "rearwardly," "front," "forward," and "forwardly" are used in the following description with respect to a position or direction relative to a backpack wearer. "Rear," "rearwardly," or "rearward" are a position or in a direction toward the backpack wearer. "Front," "forwardly" and "forward" are a position or in a direction away from the backpack wearer.

The following detailed description is merely exemplary in nature and is not intended to limit the invention or the application and uses of the invention. Although the description of embodiments hereof are in the context of a backpack for holding optics attached to a tripod for use by a birder, the invention may also be used in any other applications where it is deemed useful. Furthermore, there is no intention to be bound by any expressed or implied theory presented in the preceding technical field, background, brief summary or the following detailed description.

Figure 1:
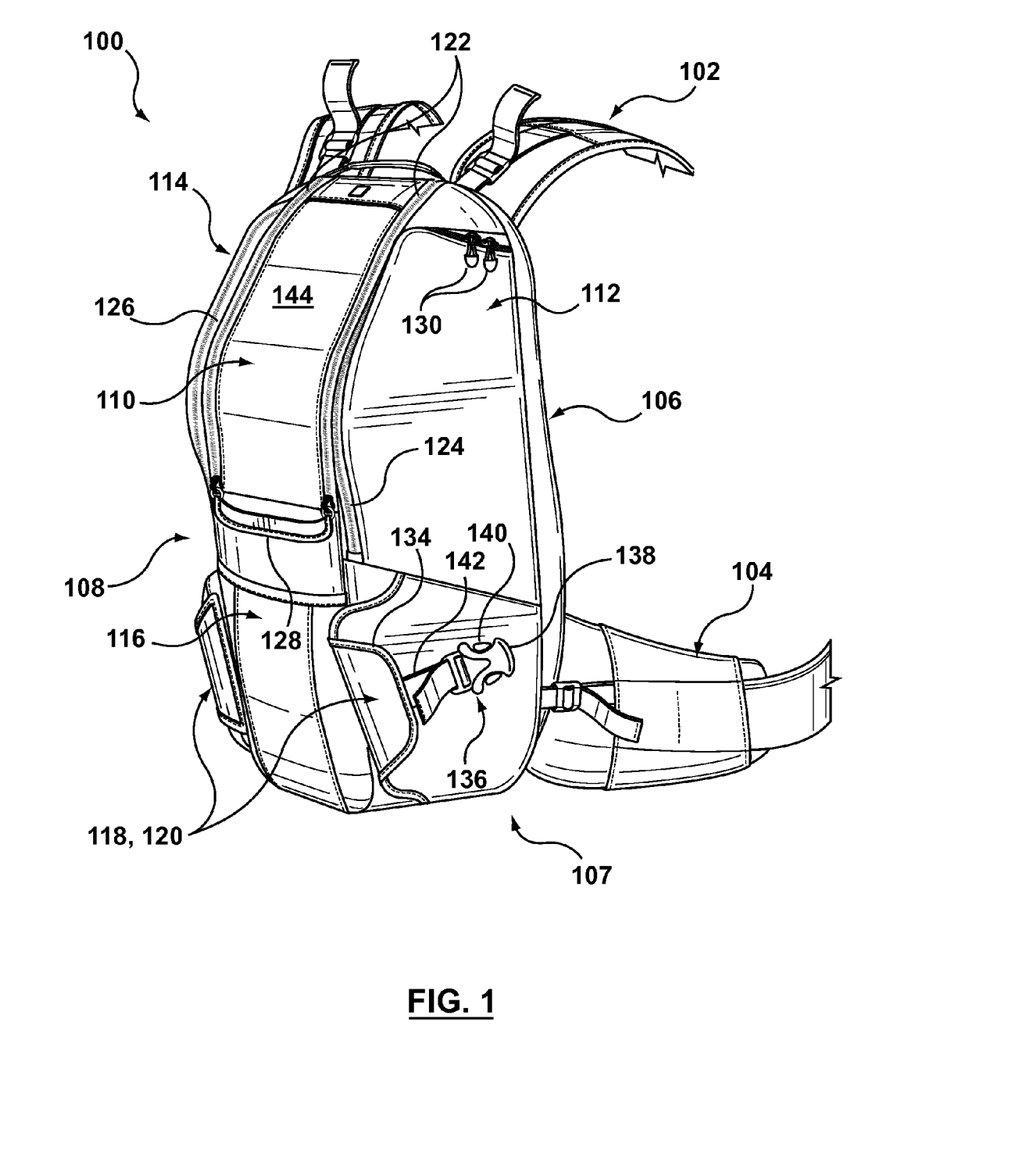
FIG. 1 is a front perspective view of an infield backpack in accordance with an embodiment hereof.
Figure 2:
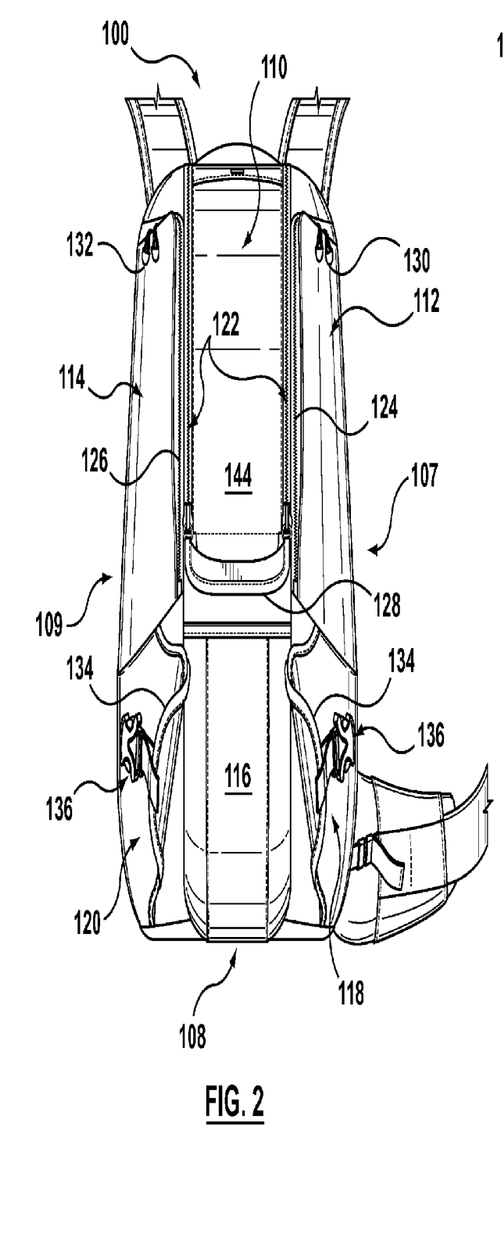
FIG. 2 is a front view of the backpack of FIG. 1.
Figure 3:
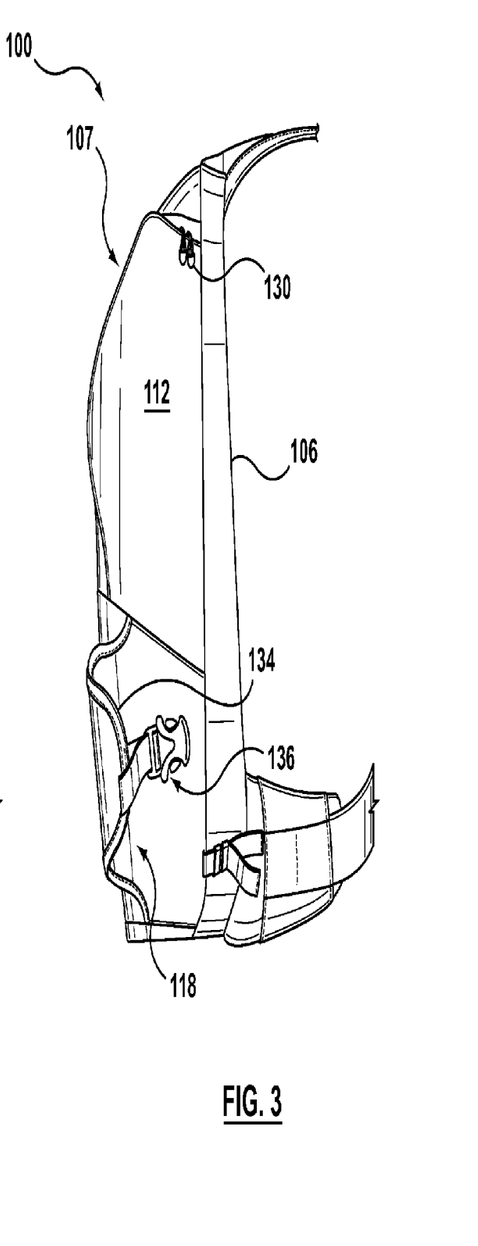
FIG. 3 is a side view of the backpack of FIG. 1.

FIG. 1 is a front perspective view of an infield backpack 100 in accordance with an embodiment hereof. Backpack 100 includes a pair of shoulder straps 102 and a waist belt 104, each of which is partially shown in FIG. 1, that are attached to extend rearwardly from a back 106 of backpack 100. Shoulder straps 102 and waist belt 104 may be adjustably sizable in a conventional manner for the comfort of a backpack wearer. In an embodiment hereof, various components of backpack 100 may be made of various woven materials, such as nylon, polyester, natural and manmade fibers, as well as flexible sheet goods consisting of flexible plastics or rubber materials as well as composites of woven and sheet goods.

With reference to FIGS. 1-6, a front 108 of backpack 100 includes an optics or main storage compartment 110 and a pocket 116 and opposing sides 107, 109 of backpack 100 include side storage compartments 112, 114 and tripod leg attachment structures 118, 120, respectively. Each of main and side storage compartments 110, 112 and 114 are opened and closed via respective zippers 122, 124, 126 and handles or pulls 128, 130, 132. Each tripod leg attachment structure 118, 120 is generally located below optics storage compartment 110 and includes a leg securing flap 134 and a buckle assembly 136. More particularly as described with reference to backpack side 107 with the arrangement being identical for opposing backpack side 109, buckle assembly 136 includes a female component 138 attached to backpack side 107 and a male component 140 attached to a strap 142 that extends from leg securing flap 134. It would be understood by one of ordinary skill in the art that the attachment of the female and male buckle components may be switched without departing from the scope of the present invention. The two-piece buckle assembly 136 works in a conventional manner with male component 140 being sized to slide and lock within female component 138 when cam-like projections of male component 140 snap within corresponding openings of female component 138, wherein the cam-like projections of male component 140 may then be squeezed toward one and other to clear the openings of female component 138 so that male component 140 may be removed from female component 138. In order for tripod leg attachment structures 118, 120 to be adjustable to hold tripod legs of various diameters, strap 142 may be pulled through a locking slot in male buckle component 140 to loosen or tighten a respective tripod leg attachment structure 118, 120 about a tripod leg as discussed in more detail below. In an embodiment, female and male components 138, 140 of buckle assembly 136 may be made of a polymeric material such as acetal or nylon.

In various other embodiments, buckle assembly 136 may be replaced by another fastening means such as a compression buckle, a dual hoop buckle, a belt-type buckle that includes a prong, one or more snaps or VELCRO.

Figure 4:
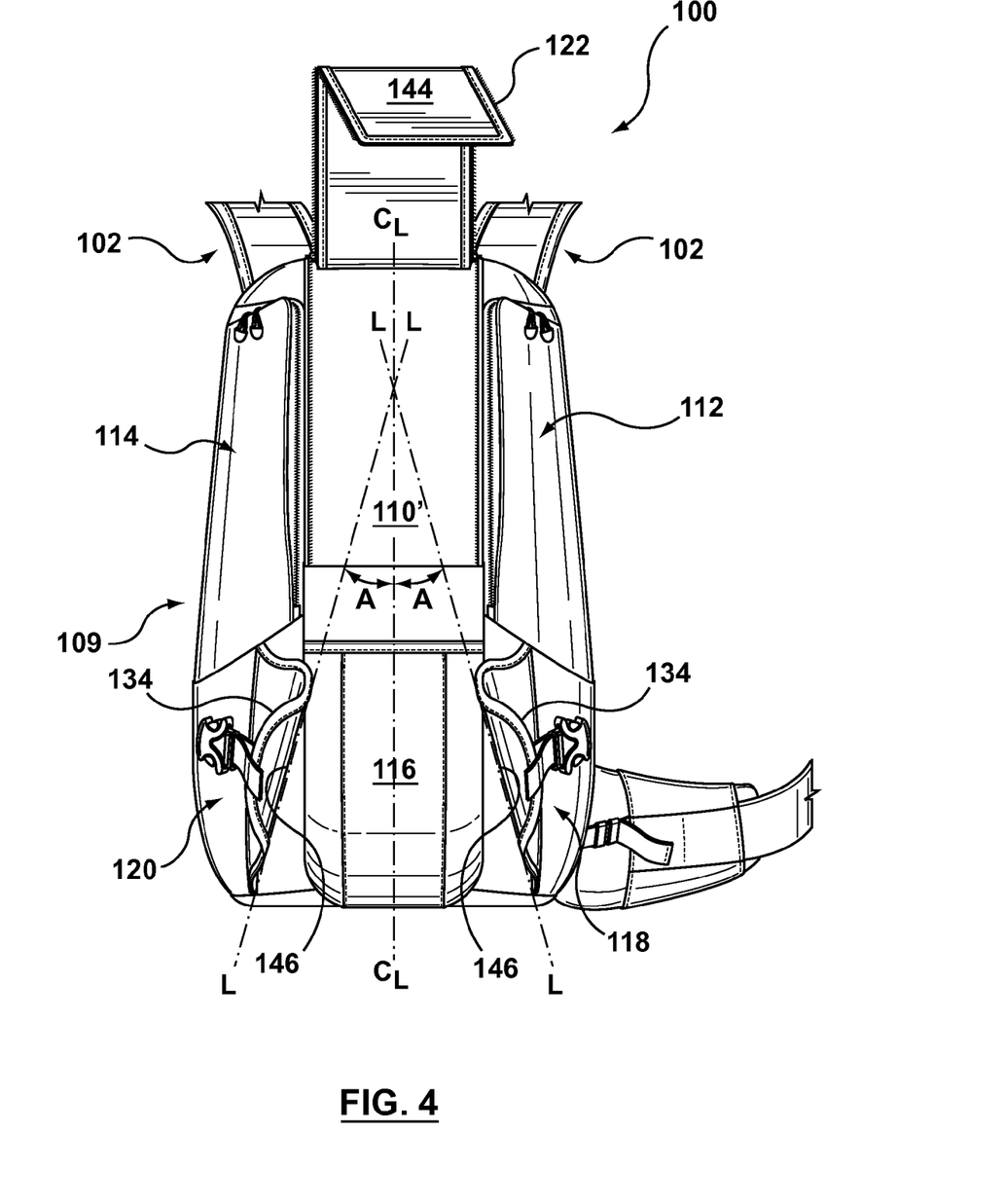
FIG. 4 is a front view of the backpack of FIG. 1 with an optics storage compartment in a fully open configuration.
Figure 5:
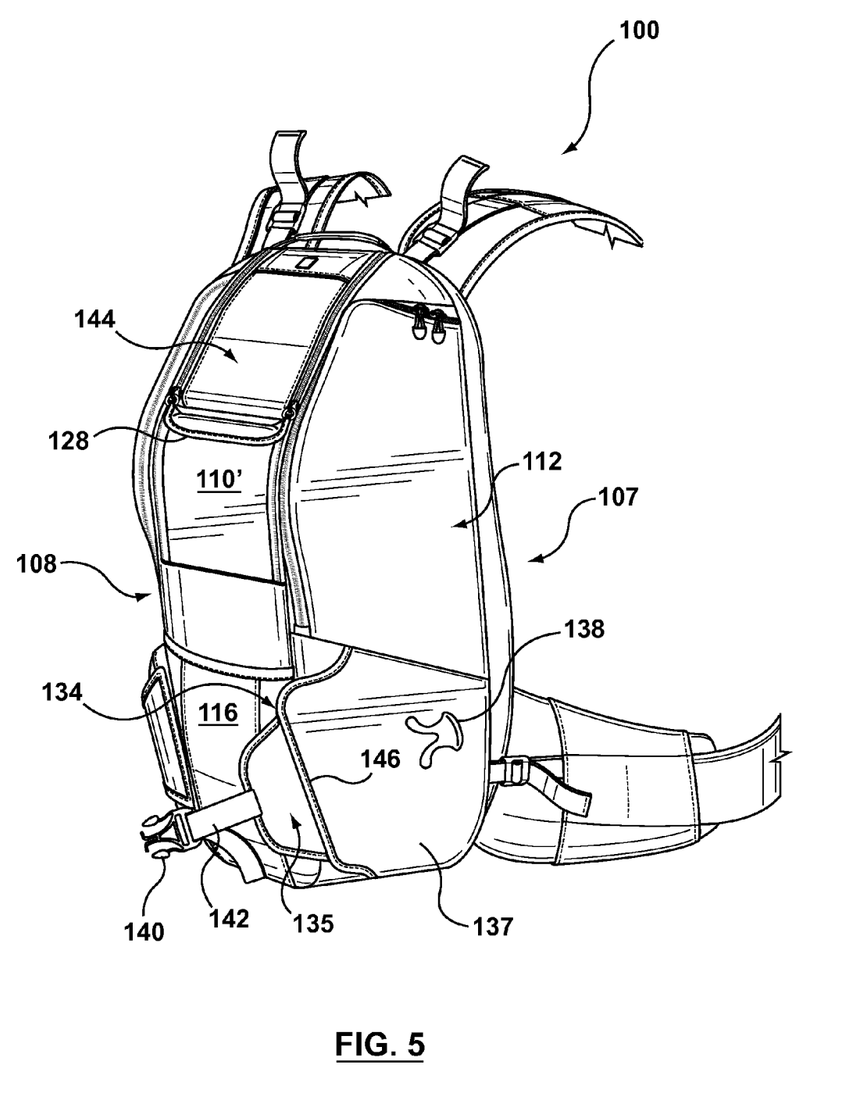
FIG. 5 is a perspective view of the backpack of FIG. 1 with the optics storage compartment in a partially open configuration.
Figure 6:
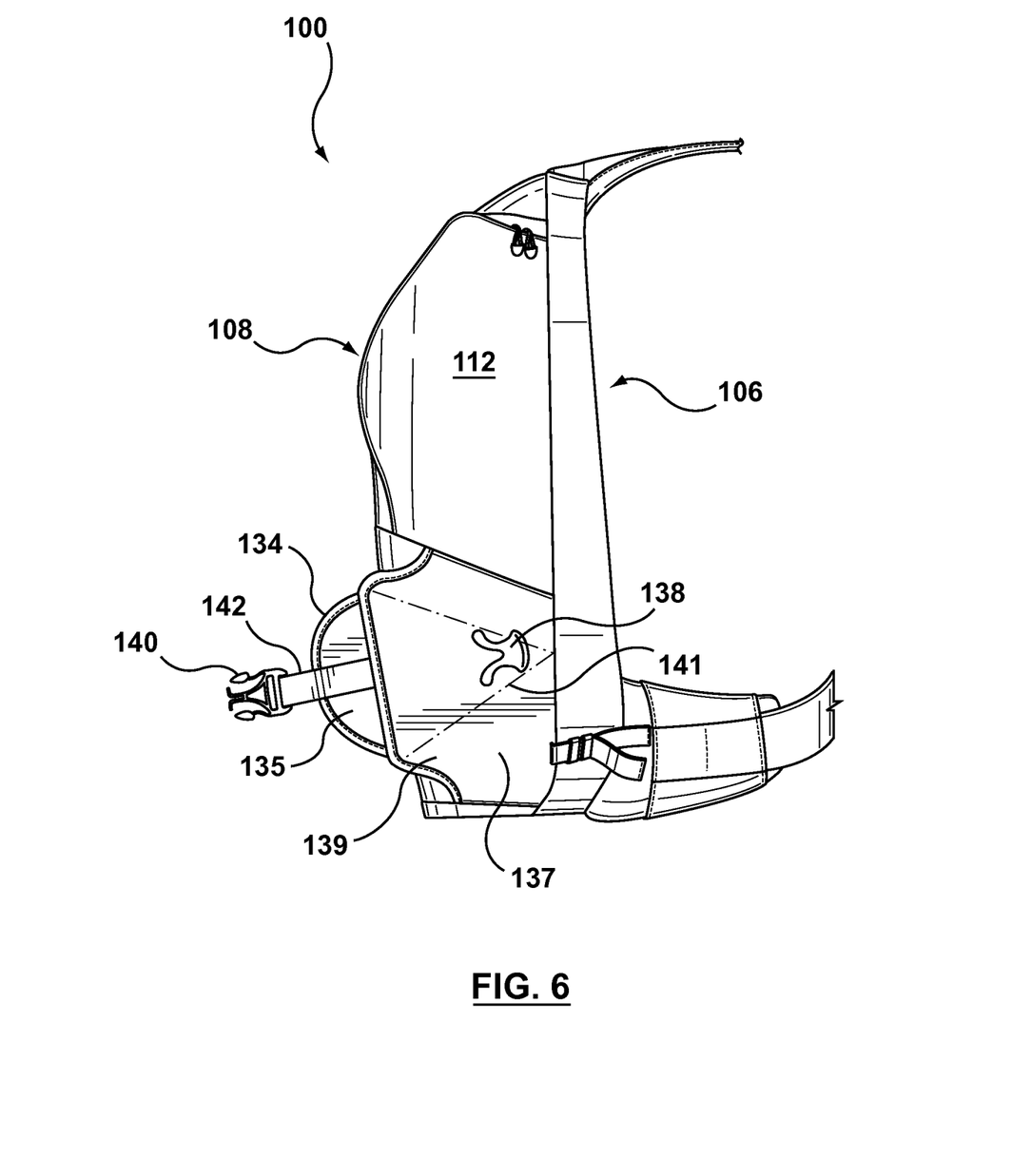
FIG. 6 is a side view of the backpack in FIG. 1 with an interior of a side panel exposed in accordance with an embodiment hereof

Optics or main storage compartment 110 has a cover 144 that is hinged along a top edge and is flanked on opposing long sides by zippers 122. As shown in FIG. 4, cover 144 may be fully opened or unzipped to allow generous access to an interior 110' of optic storage compartment 110. More particularly, cover 144 is sized to close an opening to interior 110' that extends from a top or upper side of backpack 100 to at or just above or below a midline of backpack 100 along front 108. Interior 110' of optic storage compartment 110 is a substantially cuboid-shaped volume that is sized to receive a spotting scope therein. In an embodiment, interior 110' of optic storage compartment 110 is padded and dimensioned, without taking into account the thickness of the padding, to have a length that extends from substantially the top to a bottom of backpack 100, a depth that extends from substantially back 106 to front 108 of backpack 100 and a width that is substantially equal to a width of front 108. When a spotting scope and tripod are secured to infield backpack 100, as described below, and optic storage compartment 110 is fully opened, the spotting scope may be rotated away from the tripod and into optic storage compartment interior 110' such that the spotting scope is in a protective environment while not in use. In the alternative, the spotting scope may be rotated out of optic storage compartment interior 110' from a stowed position into a deployed or viewing position on the tripod when needed in the field. As shown in FIG. 5, cover 144 is designed to be folded over such that cover 144 may be zipped down over optic storage compartment interior 110 so that optic storage compartment 110 remains partially opened along backpack front 108. In the partially open configuration, a spotting scope stowed within optic storage compartment 110 may be protected from the elements while still being attached to the tripod.

As mentioned above, each tripod leg attachment structure 118, 120 includes a respective leg securing flap 134. As described with reference to backpack side 107 shown in FIGS. 4, 5 and 6 with the arrangement being identical for backpack side 109, leg securing flap 134 is fixedly attached to backpack 100 in such a manner as to have a hinged portion 146 that lies along a line L that is at an acute angle A from a centerline $C_L$ of backpack 100. Line L generally aligns with a hinge of a tripod leg about which it is to be secured such that hinged portion 146 permits leg securing flap 134 to be rotatable or pivotable about the tripod leg, which is generally in a direction towards and away from backpack side 107. More particularly, the tripod leg hinge is connected a body portion of the tripod at or about centerline $C_L$ of backpack 100 and therefore is not in alignment with the normal angles of backpack 100. Thus, in order to allow the tripod leg hinge to operate for added functionality in carrying the tripod on backpack 100, such as to permit the tripod legs to be collapsed to minimize protrusions while walking, to allow for rapid deployment of the tripod legs, as well as to allow for adjusting the length of the tripod legs, angle A of line L is positioned radially from the centerline $C_L$ of backpack 100. In an embodiment, the relationship between angle A of line L and centerline $C_L$ is also dependant on the stiffness of side panels 137. In an embodiment, acute angle A is 35°±10° to centerline $C_L$ of backpack 100.

When a tripod is to be secured to backpack 100, a first leg of the tripod is seated or mated against a side panel 137 and leg securing flap 134 is rotated in a rearward direction around the first tripod leg so that male and female buckle components 136, 138 may be interlocked or mated to thereby hold the first tripod leg against side panel 137. This process is repeated for a second tripod leg to be held by leg securing flap 134 against a corresponding side panel 137 of backpack side 109. Each leg securing flap 134 has a leg contacting surface 135 that is constructed of a nonslip or high friction material, such as nonslip rubber, and/or may include tightening straps or "hanked" straps and/or a mechanical connection with the mating surface on the tripod leg, to aid in holding the tripod leg fixed against a respective side panel 137. In an embodiment, a tripod leg held by leg securing flap 134 may still be rotated approximately 45° to permit the functionalities noted above. In an embodiment, side panels 137 are reinforced by a stiffening board 139 (shown shaded in FIG. 6) that is secured below an outer material of backpack 100. The reinforced side panels 137 prevent buckling and provide a stable platform against which the leg securing flaps 134 may be secure a respective tripod leg. In an embodiment, stiffening board 139 is a 1 mm thick polyethylene board. In another embodiment, one or more polymeric or metallic rods 141 (represented by dashed lines in FIG. 6) may be positioned under side panel 137 to extend generally from back 106 to front 108 of backpack 100 in order to further stabilize side panel 137.

Figure 7:
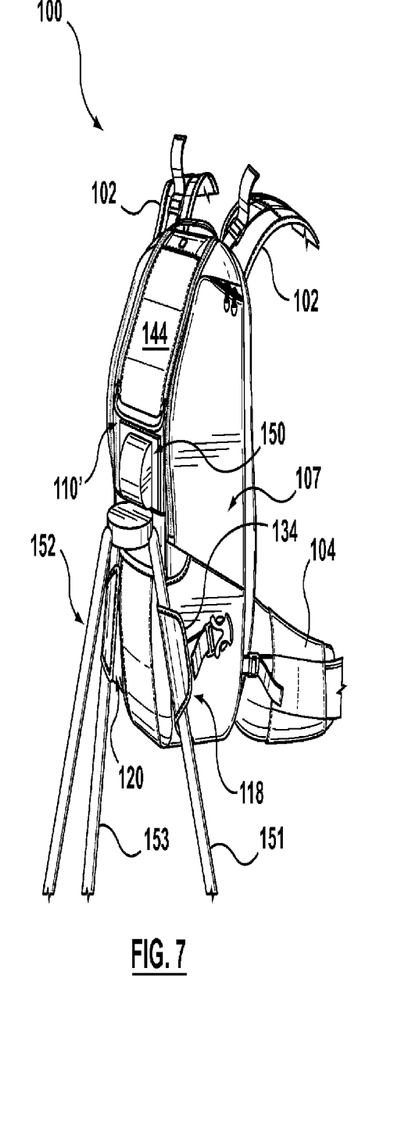
FIGS. 7, 8 and 9 are illustrations of a backpack in accordance with an embodiment hereof being shown with a spotting scope attached to a tripod in a fully stowed configuration, a partially stowed configuration and a deployed configuration, respectively.
Figure 8:
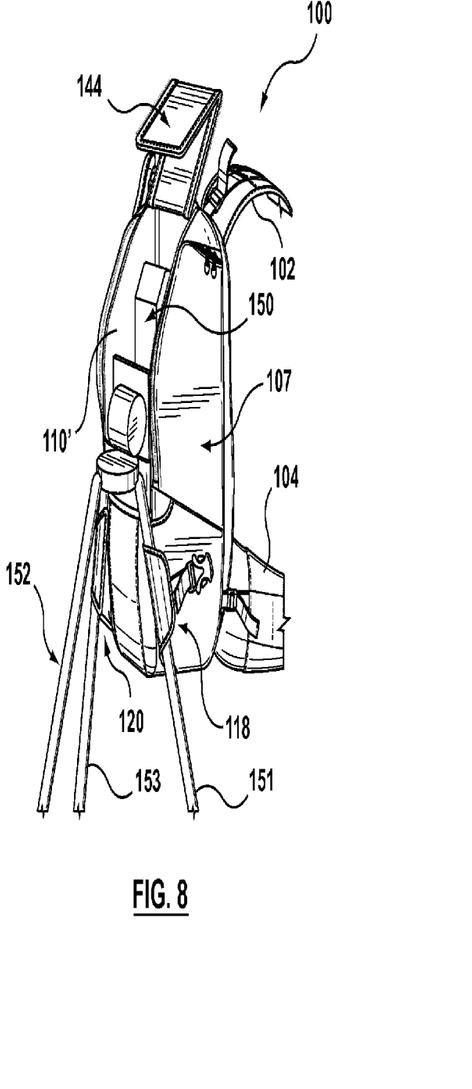
Figure 9:
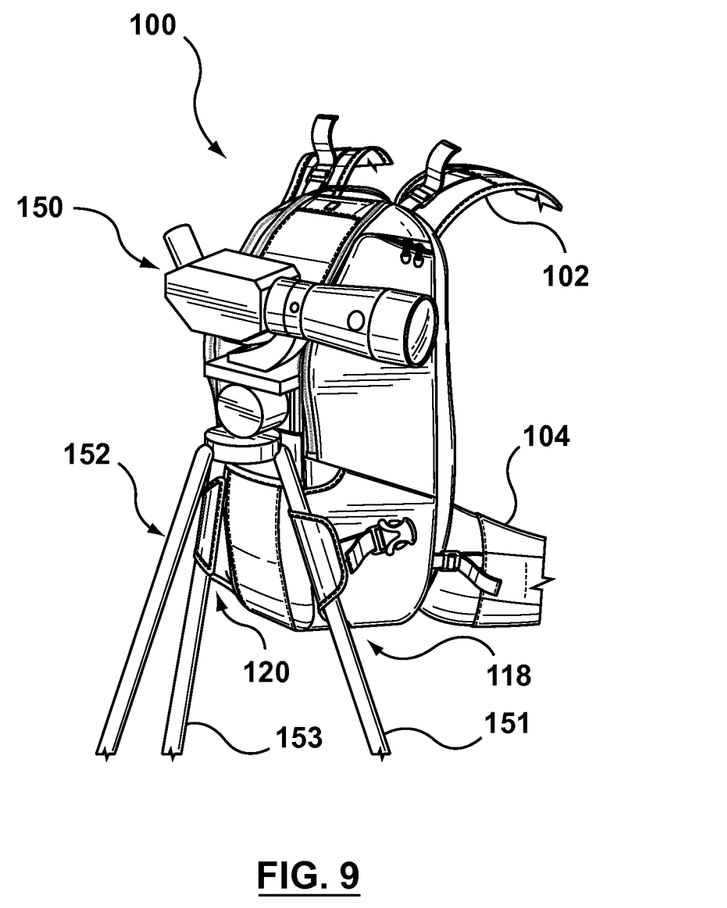

FIGS. 7, 8 and 9 are illustrations of backpack 100 shown with a spotting scope 150 attached to a tripod 152 secured thereto. The detail of backpack 100 previously shown in FIGS. 1-6 has been simplified in FIGS. 7-9 in order to primarily show the function of backpack 100. In FIGS. 7-9, a first leg 151 of tripod 152 is held against backpack side 107 by tripod leg attachment structure 118 and a second leg 153 of tripod 152 is held against backpack side 109 by tripod leg attachment structure 120 in a manner as discussed above. Due to the angle at which leg securing flaps 134 are positioned relative to centerline $C_L$ of backpack 100, tripod 152 and backpack 100 are maintained in the same relative longitudinal position with respect to each other, i.e., backpack 100 will not substantially slide down first and second tripod legs 151, 153. This feature ensures that while tripod 152 is secured to backpack 100 by tripod leg attachment structures 118, 120 that spotting scope 150 is held or positioned essentially level with optics storage compartment 110 to be readily rotated into and out of interior 110' by a user.

In FIG. 7, spotting scope 150 is shown rotated within optics storage compartment interior 110' with cover 144' zipped there over to be in a fully stowed configuration within backpack 100. In FIG. 8, cover 144 is shown unzipped and positioned as shown in FIG. 4 leaving optics storage compartment interior 110' uncovered such that spotting scope 150 is in a partially stowed configuration. In FIG. 9, spotting scope 150 has been rotated out of optics storage compartment interior 110' into a deployed configuration on tripod 152 such that spotting scope 150 is ready for use. In each of the configurations shown in FIGS. 7-9, tripod 152 may be set-up on the ground or other stabilizing surface while supporting backpack 100 as shown so that the user may easily access, use and than stow spotting scope 150. As well, backpack 100 may be worn by a user with spotting scope 150 and tripod 152 in any of the configurations shown in FIGS. 7-9 depending on the user's preference. However for the best protection of spotting scope 150, the user likely will fully or partially stow spotting scope 150 as shown in FIGS. 7 and 8 prior to shouldering backpack 100 and setting out.

Backpack 100 is a composite structure and may be constructed of various weatherproof fabrics such as nylon, polyester, cotton or other woven materials or alternatively sheet goods consisting of flexible plastic and webbing to provide ruggedness as well as style. Backpack 100 may include pads or padding of neoprene, foam such as polyethylene (PE) foam or ethylene vinyl acetate (EVA) foam, or other cushioning material.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A backpack for carrying a spotting scope or other optic device attached to a tripod comprising:
   a pair of shoulder straps extending from a back of the backpack;
   an optics storage compartment having an interior that is accessible via an opening within a front of the backpack, the opening longitudinally extending from a top edge of the backpack to adjacent a midline of the backpack;
   a cover hinged along the top edge of the backpack and having opposing long edges that extend from the top edge of the backpack to adjacent the midline of the backpack, the cover being removable from covering the opening for accessing the interior of the optics storage compartment;
   a first tripod leg attachment structure positioned below the opening of the optics storage compartment for securing a first leg of a tripod against a corresponding first side of the backpack; and
   a second tripod leg attachment structure positioned below the opening of the optics storage compartment for securing a second leg of the tripod against a corresponding second side of the backpack that is opposed to the first side of the backpack,
   wherein when the tripod is attached to the backpack by the first and second tripod leg attachment structures a spotting scope or other optic device attached to the tripod is positioned to be rotatable into and out of the interior of the optics storage compartment by a user via the longitudinally extending opening within the front of the backpack.

2. The backpack of claim 1, wherein the hinged cover may be folded and partially secured to cover only a portion of the opening of the optics storage compartment.

3. The backpack of claim 1, wherein each of the first and second tripod attachment structures includes a leg securing flap and a buckle assembly.

4. The backpack of claim 3, wherein each of the leg securing flaps is hinged to be rotatable between the front and the respective corresponding first or second side of the backpack.

5. The backpack of claim 4, wherein a first component of the buckle assembly is attached to the leg securing flap and a second component of the buckle assembly is attached to the respective corresponding first or second side of the backpack.

6. The backpack of claim 5, wherein a tripod leg contacting surface of the leg securing flap is covered with a nonslip material.

7. The backpack of claim 5, wherein portions of the corresponding first and second sides of the backpack upon which the leg securing flaps are secured are reinforced for stability.

8. A backpack for carrying a spotting scope or other optic device attached to a tripod comprising:
   a pair of shoulder straps extending from a back of the backpack;
   an optics storage compartment having an interior that is accessible from a front of the backpack via a zippered cover that longitudinally extends from a top to adjacent a midline of the backpack front, wherein the zippered cover is hinged along a top edge of the backpack and has opposing long edges that extend from the top to adjacent the midline of the backpack with each long edge having a respective zipper attached thereto;
   a first tripod leg attachment structure positioned below the zippered cover of the optics storage compartment and attached to a first side of the backpack; and
   a second tripod leg attachment structure positioned below the zippered cover of the optics storage compartment and attached to a second side of the backpack that is opposed to the first side of the backpack, wherein when a tripod is attached to the backpack by the first and second tripod leg attachment structures a spotting scope or other optic device attached to the tripod is positioned to be rotatable into and out of the interior of the optics storage compartment by a user.

9. The backpack of claim 8, wherein the hinged cover may be partially unzipped and folded to cover only a portion of an opening of the optics storage compartment.

10. The backpack of claim 8, wherein each of the first and second tripod attachment structures includes a leg securing flap and a buckle assembly.

11. The backpack of claim 10, wherein each of the leg securing flaps is hinged to be rotatable between the front and the respective corresponding first or second side of the backpack.

12. The backpack of claim 10, wherein a tripod leg contacting surface of the leg securing flap is covered with a nonslip material.

13. A backpack for carrying a spotting scope or other optic device attached to a tripod comprising:
   a pair of shoulder straps extending from a back of the backpack;
   an optics storage compartment having an interior that is accessible via an opening within a front of the backpack, the opening longitudinally extending from a top edge of the backpack to adjacent a midline of the backpack;
   a cover hinged along the top edge of the backpack and sized to extend from the top edge of the backpack to adjacent the midline of the backpack, the cover being removable from covering the opening for accessing the interior of the optics storage compartment;
   a first tripod leg attachment structure having a first leg securing flap and a first buckle assembly, wherein the first leg securing flap is attached to the backpack to have a hinged portion thereof disposed below the opening of the optics storage compartment at a first acute angle with respect to a centerline of the opening such that the hinged portion of the first leg securing flap is positioned to align with and wrap over a first leg of a tripod to be secured thereby; and a second tripod leg attachment structure having a second leg securing flap and a second buckle assembly, wherein the second leg securing flap is attached to the backpack to have a hinged portion thereof disposed below the opening of the optics storage compartment at a second acute angle with respect to the centerline of the opening such that the hinged portion of the second leg securing flap is positioned to align with and wrap over a second leg of the tripod to be secured thereby, wherein the first and second acute angles are equal adjacent angles having a common vertex and a common side along the centerline of the opening, wherein when the tripod is attached to the backpack by the first and second tripod leg attachment structures a spotting scope or other optic device attached to the tripod is positioned to be rotatable into and out of the interior of the optics storage compartment by a user via the longitudinally extending opening in the front of the backpack.

14. The backpack of claim 13, wherein each of the first and second leg securing flaps is hinged to be rotatable between the front and a respective corresponding first or second side of the backpack.

15. The backpack of claim 14, wherein a first component of each of the first and second buckle assemblies is attached to the respective first or second leg securing flap and a second component of each of the buckle assemblies is attached to the respective corresponding first or second side of the backpack.

16. The backpack of claim 13, wherein a respective tripod leg contacting surface of the first and second leg securing flaps is covered with a nonslip material.

* * * * *